March 21, 1972 J. E. GLATT ET AL 3,651,191
METHOD FOR MOLDING PLASTIC ARTICLES HAVING IMBEDDED INDICIA
Original Filed Oct. 25, 1967 2 Sheets-Sheet 1
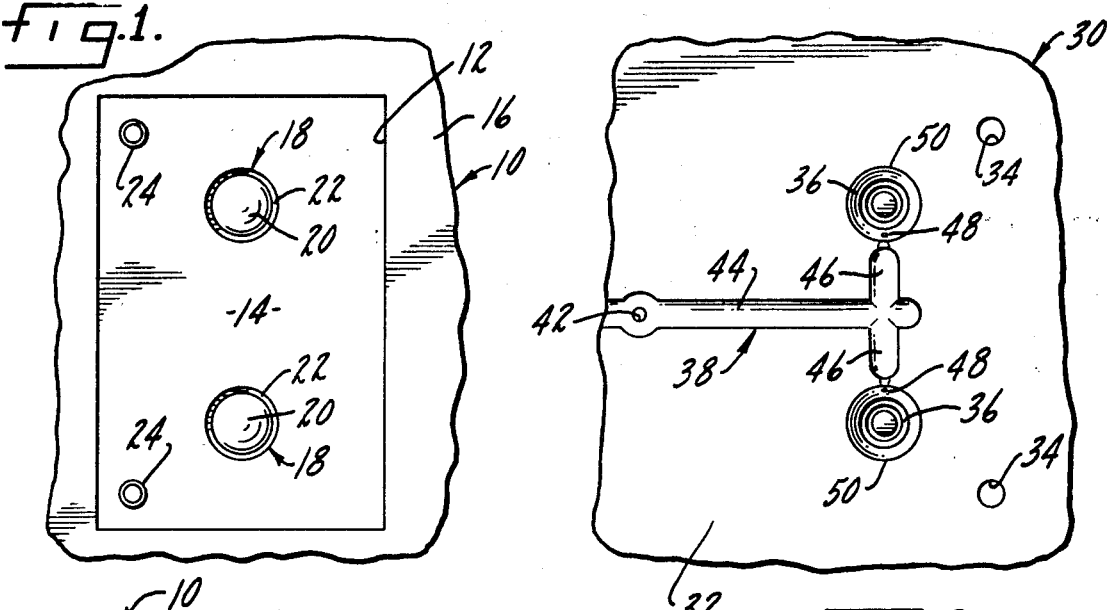
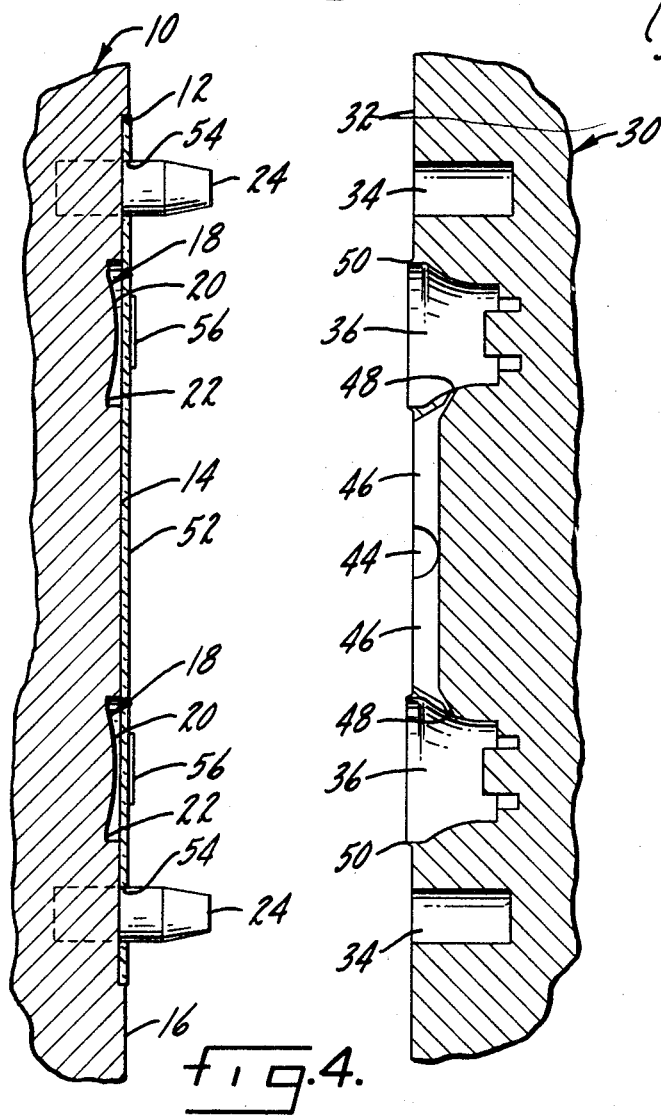
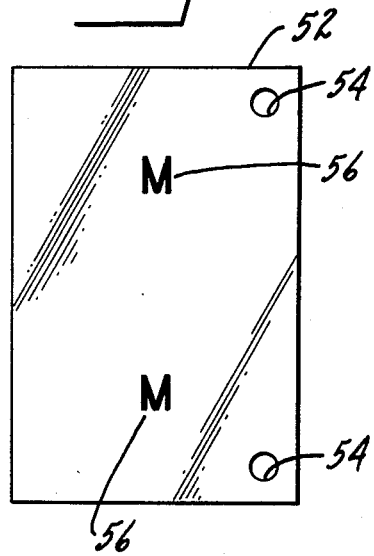
INVENTORS.
JACK E. GLATT
JACOB J. DETZEL
BY Parker & Carter
Attorneys.

March 21, 1972   J. E. GLATT ET AL   3,651,191

METHOD FOR MOLDING PLASTIC ARTICLES HAVING IMBEDDED INDICIA

Original Filed Oct. 25, 1967   2 Sheets-Sheet 2

INVENTORS.
JACK E. GLATT
JACOB J. DETZEL
BY Parker & Carter
Attorneys.

:::::::::::::::::::::::::::::::::::::::::::::::::::::::::::::::

United States Patent Office 3,651,191
Patented Mar. 21, 1972

3,651,191
METHOD FOR MOLDING PLASTIC ARTICLES
HAVING IMBEDDED INDICIA
Jack E. Glatt, 134 S. Hills Drive, Barrington, Ill. 60010,
and Jacob J. Detzel, 4830 W. Cullom, Chicago, Ill.
60641
Original application Oct. 25, 1967, Ser. No. 677,965.
Divided and this application Oct. 29, 1969, Ser. No.
871,348
Int. Cl. B29d 19/00
U.S. Cl. 264—153                           1 Claim

ABSTRACT OF THE DISCLOSURE

A method for making plastic articles having a bonded plastic film overlay under which indicia may be protectively imbedded which includes the steps of: (1) positioning a plastic film between two mold parts; (2) forming a line of reduced strength around those portions of the plastic film within the mold cavities; and (3) injecting molten plastic into each mold cavity and fusing the film thereto. Indicia may be applied to the plastic film.

A mold for making plastic articles including a first part and a second part adapted to close in registry to form at least one mold cavity; the first mold part is formed with a recess adapted to receive the plastic film and locator pins for accurately positioning the film therein. The second mold part is formed with a cutting knife extending around each mold cavity so that as the mold parts are closed about the plastic film, each cutting knife forms a closed cut line around those portions of the film within the mold cavities.

---

This application is a division of copending application Ser. No. 677,965, filed Oct. 25, 1967, now abandoned.

SUMMARY OF THE INVENTION

This invention relates to a method for economically producing plastic articles which have decorative or informative indicia protectively imbedded within or molded into the article.

One object of this invention is to provide a method for economically producing plastic articles having decorative or informative indicia molded into the article.

Another object of this invention is to provide a method for making thermo-plastic articles wherein decorative or informative indicia is applied to a clear film or sheet of plastic and then the film is bonded to a slug of molten plastic material.

Another object of this invention is to provide a method for molding a thermo-plastic article having inlaid decorative or informative indicia wherein the article requires no further processing after ejection from the mold.

Another object is an economical method for mass-producing plastic articles which have a clear, sharp, accurately positioned, decorative or informative indicia imbedded or inlaid beneath a clear, wear-resistant surface of plastic which is securely bonded to the main body of the article.

BRIEF DESCRIPTION OF THE DRAWINGS

The mold of this invention is illustrated more or less diagrammatically in the accompanying drawings wherein:

FIG. 1 is a partial front elevational view of one of the mold parts of this invention;

FIG. 2 is a partial front elevational view of the other mold part of this invention;

FIG. 3 shows one example of the plastic film to be used with the mold and method of this invention;

FIG. 4 is an elevational cross section showing the mold parts of FIGS. 1 and 2 in operational relationship and with the film of FIG. 3 positioned on the mold part of FIG. 1;

DESCRIPTION OF THE PREFERRED EMBODIMENTS

Figure 5:
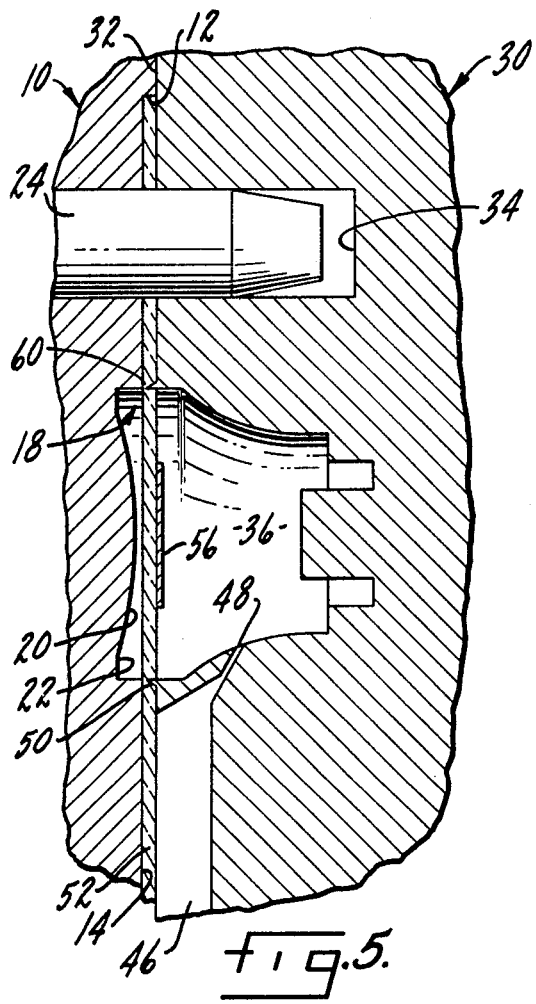
FIG. 5 is a partial cross sectional view to an enlarged scale showing the mold parts closed about the film of FIG. 3.
Figure 6:
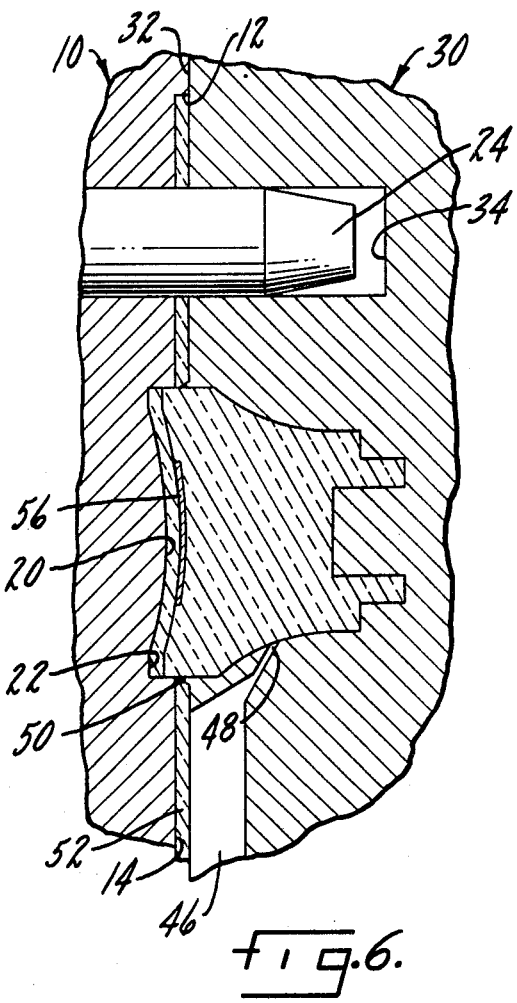
FIG. 6 is a view like FIG. 5 showing molten plastic material being injected into the mold cavity.

Referring now to FIG. 1, a first mold cavity block is shown generally at 10 formed with a recess 12 having a planar bottom surface 14 which is spaced from and generally parallel to a mold parting line surface 16. Suitable mold cavities, as at 18, are formed in the mold cavity block 10. Although only two cavities 18 have been shown, it should be understood that more or less than two cavities may be used. It should also be understood that the configuration of the cavities 18 may be widely varied depending upon the configuration of the desired finished product. In this instance, the mold cavity block is shown adapted to make buttons or typewriter keys and therefore the cavities 18 are generally circular and are formed with a bottom surface having a spherical portion 20 and an annular planar portion 22.

The mold cavity block 10 may carry two or more suitable locator pins 24 positioned within the recess 12 and extending normally from the bottom surface 14 of the recess 12. The purpose of these locator pins will be explained hereinafter.

Although the recess 12 has been shown as being generally rectangular, it should be understood that any shape, such as circular, square, etc., may be used. Further, the recess may be formed like a channel to allow continuous feeding of the plastic film.

Referring now to FIG. 2, a second mold cavity block, adapted to close in registry with the mold cavity block 10, has been shown at 30 as having a generally planar parting line surface 32, pilot holes 34 adapted to receive the locator pins 24, suitable cavities 36 corresponding to each cavity 18 in mold block 10 and means for delivery of the molten plastic material into the mold cavity 36.

As with the cavities 18, the configuration of the cavities 36 will vary depending upon the desired finished product. In this instance, the mold is adapted to make typewriter keys or buttons and the cavities 36 have been shown formed accordingly.

As best seen in FIG. 4, the mold part 30 is formed with a cutting knife 50 for each cavity 36. Each knife 50 projects from surface 32 and extends around its respective mold cavity.

The means for directing the molten plastic material to each cavity 36 has been shown as including a sprue 42, suitable runners 44 and 46, and suitable submarine gating 48 communicating the runners 46 with the cavities 36. Although a particular sprue and runner configuration has been shown, it will be undestood that a variety of well-known variations or changes may be made depending upon the number of cavities in the mold.

Referring now to FIG. 3, a thin film or sheet of plastic material has been shown at 52 formed with operings 54 sized to receive the locator pins 24. Indicia 56 is printed or otherwise suitably applied to the film 52 in registry to the holes 54, so that when the film is positioned over the locator pins 24, the indicia 56 is accurately located relative to each mold cavity as shown in FIG. 4. Although the indicia 56 has been shown as being the letter "M," it should be understood that a word, a picture, or any suitable decorative or informative indicia may be used.

The mold cavity blocks 10 and 30 are adapted to be conventionally mounted in an injection molding machine in opposed relationship as shown in FIG. 4. With the mold parts 10 and 30 so positioned, the film 52 is placed within the recess 12 with the locator pins 24 extending through the openings or guide holes 54. As previously mentioned, since the indicia 56 is registered relative to the guide holes 54, when the sheet 52 is inserted within the recess 12, the indicia 56 is accurately positioned relative to each cavity 18. The depth or the recess 12 or the distance between surface 14 and surface 16 is slightly less than the thickness of the film 52 so that when the mold parts 10 and 30 are closed in registry, as shown in FIG. 5, the film 52 is slightly compressed to firmly hold it in place.

Upon closing the mold parts 10 and 30, as shown in FIG. 5, each cutting knife 50 extends into the pjlastic film and forms a closed cut line around that portion of the plastic film within each mold cavity. Each cutting knife projects from surface 32 a distance slightly less than the depth of the recess 12 so that a small gap 60 exists between the cutting knife and the surface 14. Although a gap of 0.0005 inch has been found satisfactory, this distance may be varied.

After the mold parts 10 and 30 are closed in registry about the sheet material 52, molten plastic material is injected into each cavity 36 through the sprue 42, runners 44 and 46, and the gates 48. As the plastic material is injected into the mold cavities, the pressure and temperature of the molten plastic material causes those portions of the plastic film 52 within the mold cavities to be severed from the reside or sheet material outside the mold cavities along the lines of weakness formed by the cutting knives. During this severing process, those portions of the plastic film within the mold cavities are carried to the desired positions. The temperature of the molten plastic material injected into the cavity 36 causes the surface of the film 52 in contact therewith to melt and fuse with the injected mass of plastic so that upon solidification, the film is securely bonded or welded to the mass of plastic material injected into the cavity. Depending upon the size and configuration of the article to be molded, the plastics used, and the thickness of the film 52, it may be necessary to vary the temperature of the injected molten plastic and the temperature of the mold parts 10 and 30 to obtain a secure bond between the film and the mass of injected plastic and to prevent distortion of the indicia 56 in the finished product. For example, it has been found that when molding a relatively small article such as a button or typewriter key, to obtain a secure bond between the film and the mass of injected plastic it is necessary to heat the plastic to the high side of the melt and to maintain the mold at a temperature of around 180° F.

Depending upon the size and configuration of the desired finished product, the gating may be varied to insure that the injected material builds up within the cavity 36 in a uniform manner and does not wash against and distort the indicia 56.

After injection of the molten plastic within the mold cavity 36, the mold parts 10 and 30 are retained in a closed position for a suitable dwell period to allow solidification to take place.

The mold part 30 may be provided with means for ejecting the finished article therefrom. Such ejection means are well known to those skilled in the art and therefore will not be depicted or described herein.

After separation of the mold parts 10 and 30, the finished article is ejected in a conventional manner from the mold part 30. An important feature of this invention is that when the finished article is so ejected, no further processing or finishing steps are required to place the article in marketable condition. This is because of three factors: (1) with the submarine-type gating, degating occurs when the part is ejected from the mold part; (2) the portion of the plastic film 52 within the mold cavity is severed from the residue plastic film by the combined effects of the cutting knife 50 and the pressure and temperature of the injected plastic; and (3) the gasket effect of the plastic film which is compressed within the recess 12 prohibits flash forming leakage through the small gap.

The materials used for the film 52 and for injecting into the mold cavity may be widely varied although the film should be compatible from a bonding or welding standpoint with the injected plastic. Both the film and the injected material may be transparent or one may be made opaque depending upon the position from which the indicia 56 is to be viewed. Materials such as polyethylene, nylon, styrene, acrylic, polypropylene, and other like suitable plastics may be employed.

The indicia 56 may be applied to the film 52 by printing, by vacuum deposition, and other like suitable processes.

The film thicknesses may be varied from approximately .003 of an inch up to approximately 0.010 of an inch or more depending upon the depth to which the sheet material will be drawn during the molding process and the degree of protective cover desired for the indicia. Generally, as the depth to which the film is drawn increases, the thickness of the film should be increased to allow for stretching during the molding process. The film may be die cut or preformed to allow greater depth or irregular surfaces without tearing the film.

In some instances it has been found desirable to preheat the plastic film 52 to drive off moisture which might otherwise boil off during the molding process and form undesirable blisters or bubbles beneath the film.

Figure 7:
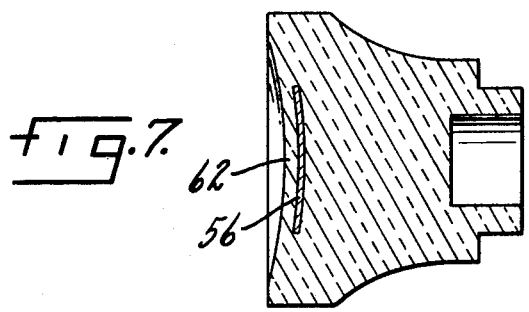
FIG. 7 is a cross sectional view of an exemplary product which may be made using the mold and method of this invention.

A typewriter key has been shown in FIG. 7 as exemplary of the plastic articles which may be made using the mold and method of this invention. As shown in FIG. 7, the indicia 56 is protectively imbedded beneath a wear-resistant cover 62 formed by the plastic film 52.

Although the film 52 has been depicted and described as having indicia 56 suitably applied thereto, it should be understood that the indicia 56 may be omitted and the film may be plain, colored, and fully or partially coated.

Although the mold and method of this invention has been thus far described and depicted as producing a finished molded article which is severed from the plastic film when ejected from the mold, in some situations it may be desirable to retain the finished molded article attached but readily severable from the plastic film. For example, this may be desirable from a storage, handling or display standpoint.

Although preferred embodiments of the mold and method of this invention have been depicted and described, such are intended to be exemplary only and not definitive. For example, although a two cavity mold has been shown, it should be understood that a mold having considerably more than two cavities may be used. It should also be understood that many further alterations and variations may be made without departing from the invention's fundamental theme. Accordingly, the scope of the invention should be limited only by the scope of the following appended claim.

What is claimed is:

1. A method of molding a plastic article, comprising:
    (a) placing a plastic film between mating faces of a pair of opposed mold members, each having a cavity therein, and which upon closing said mold members forms a common cavity divided into portions by said film, said film extending beyond the edges of said common cavity and having an indicia applied to one side within said cavity, said mold members having film cutting means around the edge of said common cavity,
    (b) closing said mold members and thereby forming by said cutting means a line of weakness in said film around the edge of said cavity, and
    (c) injecting into the portion of said divided cavity facing the indicia side of said film molten plastic at a sufficient pressure and temperature to sever said film at said line of weakness and force said severed film against the opposing mold member cavity to fuse and bond said severed film intact to said injected plastic upon solidification of said plastic.

References Cited

UNITED STATES PATENTS

| | | | |
|---|---|---|---|
| 1,881,038 | 10/1932 | Whitehouse | 264—266 |
| 2,811,744 | 11/1957 | Baldanza | 18—30 UM |
| 3,122,598 | 2/1964 | Berger | 264—266 |
| 3,280,238 | 10/1966 | Calvert | 264—266 |
| 1,920,120 | 7/1933 | Woodruff | 18—BUT DIG |

ROBERT F. WHITE, Primary Examiner

J. R. HALL, Assistant Examiner

U.S. Cl. X.R.

264—132, 163, 266